United States Patent
Sun

(10) Patent No.: US 11,606,034 B2
(45) Date of Patent: Mar. 14, 2023

(54) MULTIPHASE POWER PROCESSING CIRCUIT AND METHOD FOR CONTROL THEREOF

(71) Applicant: SHANGHAI BRIGHT POWER SEMICONDUCTOR CO., LTD., Shanghai (CN)

(72) Inventor: Shungen Sun, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 17/353,242

(22) Filed: Jun. 21, 2021

(65) Prior Publication Data

US 2021/0408912 A1    Dec. 30, 2021

(30) Foreign Application Priority Data

Jun. 24, 2020    (CN) .......................... 202010590221.4

(51) Int. Cl.
*H02M 3/158*    (2006.01)
*H02M 3/157*    (2006.01)
(Continued)

(52) U.S. Cl.
CPC ....... *H02M 3/1584* (2013.01); *H02M 1/0032* (2021.05); *H02M 1/088* (2013.01); *H02M 1/327* (2021.05); *H02M 3/157* (2013.01)

(58) Field of Classification Search
CPC combination set(s) only.
See application file for complete search history.

(56) References Cited

U.S. PATENT DOCUMENTS 7,342,383 B1 * 3/2008 Song ................... H02M 3/1588
323/222
10,594,219 B2    3/2020 Mirjafari et al.
(Continued)

FOREIGN PATENT DOCUMENTS

| CN | 101329663 A | 12/2008 |
| CN | 111082779 A | 4/2020 |
| CN | 111106848 A | 5/2020 |

OTHER PUBLICATIONS

Mei, Xueshang, "Why do IIC need to use open-drain output and pull-up resistor", Apr. 24, 2019, https://blog.csdn.net/yx1302317313/article/details/89497998, 10 pages.

*Primary Examiner* — Gary A Nash
(74) *Attorney, Agent, or Firm* — Muncy, Geissler, Olds & Lowe, P.C.

(57) ABSTRACT

Multiphase power processing circuit and a method for control thereof are disclosed, with which, exchange of data is achievable between a multiphase controller and any of power processing circuits via pins of at least two of the three categories, Enable, PWM and Temperature Indicator, of the multiphase controller. The exchanged data may include, but is not limited to, a phase identifier, an over-current protection threshold, an over-current protection threshold, an over-temperature protection threshold, a current sampling gain, a current sampling bias, a temperature sampling gain, a temperature sampling bias, a drive speed and the like of the power processing circuit. In this way, improvements in system flexibility and security are obtained.

13 Claims, 4 Drawing Sheets

(51) Int. Cl.
*H02M 1/32* (2007.01)
*H02M 1/00* (2006.01)
*H02M 1/088* (2006.01)

(56) References Cited

U.S. PATENT DOCUMENTS

| | | | |
|---|---|---|---|
| 2010/0325447 A1* | 12/2010 | Rui | H02M 3/1584 |
| | | | 713/300 |
| 2011/0051479 A1* | 3/2011 | Breen | H02M 3/1584 |
| | | | 363/148 |
| 2011/0099395 A1 | 4/2011 | Richards, III | |
| 2013/0009619 A1* | 1/2013 | Khanna | H02M 3/1584 |
| | | | 323/271 |
| 2014/0232420 A1* | 8/2014 | Luo | H02M 3/1584 |
| | | | 324/750.01 |
| 2015/0370295 A1* | 12/2015 | Luo | H02M 3/1584 |
| | | | 713/330 |
| 2017/0063239 A1* | 3/2017 | Wu | H02M 3/1584 |
| 2019/0165679 A1* | 5/2019 | Mirjafari | H02M 3/1584 |

\* cited by examiner

MULTIPHASE POWER PROCESSING CIRCUIT AND METHOD FOR CONTROL THEREOF

CROSS-REFERENCES TO RELATED APPLICATION

This application claims the priority of Chinese patent application number 202010590221.4, filed on Jun. 24, 2020, the entire contents of which are incorporated herein by reference.

TECHNICAL FIELD

The present invention relates to the field of power processing circuits and, in particular, to multiphase power processing circuitry and a method for control thereof.

BACKGROUND

Power supply circuits used in high-current or high-power applications typically employ parallel multiphase processing. Referring to FIG. 1, a power supply circuit is composed essentially of a multiphase controller and power processing circuits of N phases, Powerstage IC 1-Powerstage IC N, where N≥2. The multiphase controller applies N pulse width modulation (PMW) signals PMW1-PMWN to the respective power processing circuits Powerstage IC 1-Powerstage IC N, which are either in phase or, as shown in FIG. 2, out of phase.

Such existing power supply circuits suffer from the following deficiencies:

1. The power processing circuits Powerstage IC 1-N are usually provided by a DrMOS chip, which is typically a chip that integrates one or more dies, i.e., a chip integrating branches of bridge circuits made up of MOS transistors with driver ICs. Such DrMOS chips typically do not allow adjustment of parameters such as over-current protection threshold, over-current protection mode, current gain and switching speed due to a limited number of pins and lack of flexibility.

2. The multiphase controller has a limited number of pins and thus a very small total number of signal connections with the power processing circuits Powerstage IC 1-N. Generally, for each phase Powerstage IC 1-N, the multiphase controller provides signal connections including a PWM connection, as well as TSENS (Temperature Indicator) and EN (enable) connections shared with the other phases Powerstage IC 1-N. As a result, it is difficult for the multiphase controller to monitor the operation of each power processing circuit Powerstage IC to find out, for example, whether protection has been triggered for the specific power processing circuit, if so, which mode the triggered protection belongs to, and so on.

SUMMARY OF THE INVENTION

It is an objective of the present invention to provide multiphase power processing circuitry and a method for controlling the circuitry, which allow active configuration and active reading of parameters for power processing circuits of multiple phases with a limited pin count of a multiphase controller chip.

To this end, the present invention provides a multiphase power processing circuit. The multiphase power processing circuit includes a multiphase controller including pins of three categories, PWM, Enable and Temperature Indicator. The multiphase controller includes a plurality of PWM pins. The multiphase power processing circuit further includes a plurality of power processing circuits, each of which is coupled to a corresponding one of the PWM pins of the multiphase controller, to an Enable pin of the multiphase controller, and to a Temperature Indicator pin of the multiphase controller. The multiphase controller is configured for exchange of data with any of the power processing circuits via pins of at least two of the three categories.

Optionally, a signal at the Enable pin may be configured by the multiphase controller to have a first state representing an operating mode or a second state representing a first data mode, wherein the exchange further includes:

controlling the signal at the Enable pin to have the second state so that the power processing circuit enters the first data mode; and in the first data mode, configuring a pin of one of the three categories as a clock bus that provides a clock signal and a pin of another one of the three categories as a data bus used for exchanging data between the multiphase controller and the power processing circuit.

Optionally, the first state may be represented by a low or high voltage level and the second state by a medium voltage level, wherein the low voltage level is lower than the high voltage level, and the medium voltage level differs from the low or high voltage level.

Optionally, a signal at the Temperature Indicator pin may be configured by the multiphase controller to have a third state representing the operating mode or a fourth state representing a second data mode, wherein the exchange further includes:

controlling the signal at the Temperature Indicator pin to have the fourth state so that the power processing circuit enters the second data mode; and in the second data mode, configuring a pin of one of the three categories as a clock bus that provides a clock signal and a pin of another one of the three categories as a data bus used for exchanging data between the multiphase controller and the power processing circuit.

Optionally, the third state may be represented by a low or high voltage level and the fourth state by a medium voltage level, wherein the low voltage level is lower than the high voltage level, and the medium voltage level is different from the low or high voltage level.

Optionally, the data may include at least one of a phase identifier, an over-current protection threshold, an over-current protection threshold, an over-temperature protection threshold, a current sampling gain, a current sampling bias, a temperature sampling gain, a temperature sampling bias and a drive speed of the power processing circuit.

Optionally, the multiphase controller may be configured for parameter configuration of the power processing circuit based on the exchanged data.

Optionally, the multiphase controller may be configured to obtain the exchanged data from the power processing circuit.

Optionally, the second state that represents the first data mode may be the medium voltage level maintained for a predetermined period of time.

Optionally, the forth state that represents the second data mode may be the medium voltage level maintained for a predetermined period of time.

Based on the same inventive concept, the present invention also provides a method for controlling a multiphase controller, which is configured to control the multiphase power processing circuitry of the present invention in an analog and/or digital manner.

Compared with the prior art, the present invention offers the advantages as follows:

Exchange of data is achievable between a multiphase controller and any of power processing circuits via pins of at least two of the three categories, Enable, PWM and Temperature Indicator, of the multiphase controller, which are configured respectively as clock and data buses. The exchanged data may include, but is not limited to, a phase identifier, an over-current protection threshold, an over-current protection threshold, an over-temperature protection threshold, a current sampling gain, a current sampling bias, a temperature sampling gain, a temperature sampling bias, a drive speed and the like of the power processing circuit. In this way, improvements in system flexibility and operational security are obtained.

DETAILED DESCRIPTION

The present invention will be described below in greater detail by way of specific embodiments with reference to the accompanying drawings. Features and advantages of the invention will be more apparent from the following description. Note that the figures are presented in a very simplified form not necessarily drawn to exact scale for the only purpose of helping to explain the disclosed embodiments in a more convenient and clearer way. As used herein, the term "and/or" refers to any one of the items, any combination of the items, or all of the items with which this term is associated.

Figure 1:
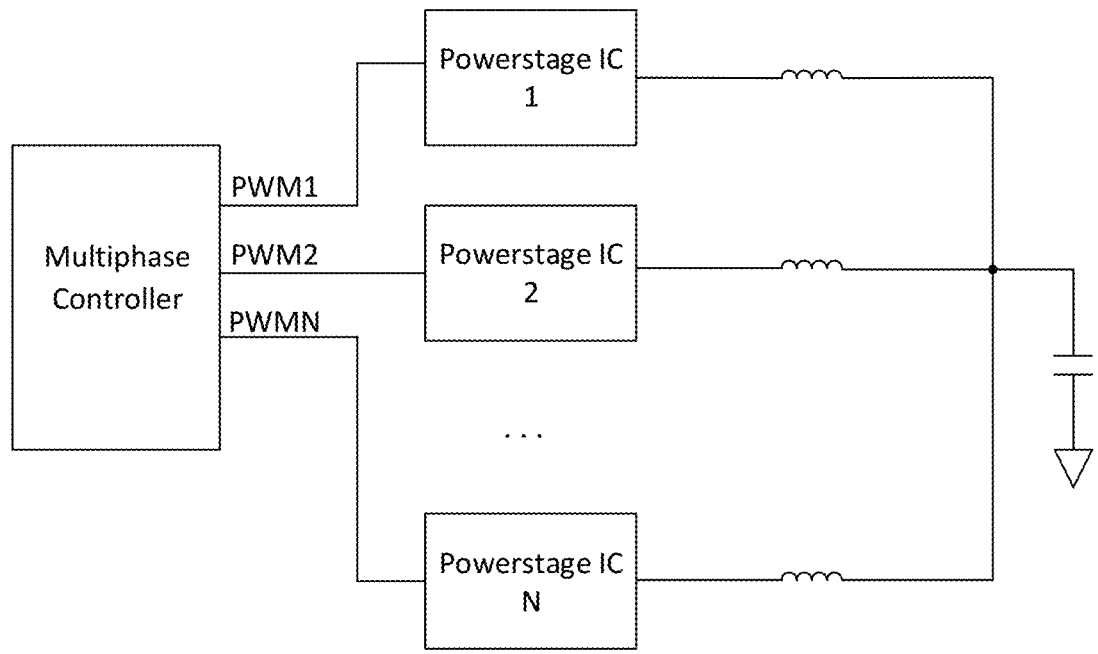
FIG. 1 shows a structural schematic of a conventional power supply circuit employing parallel multiphase processing.
Figure 2:
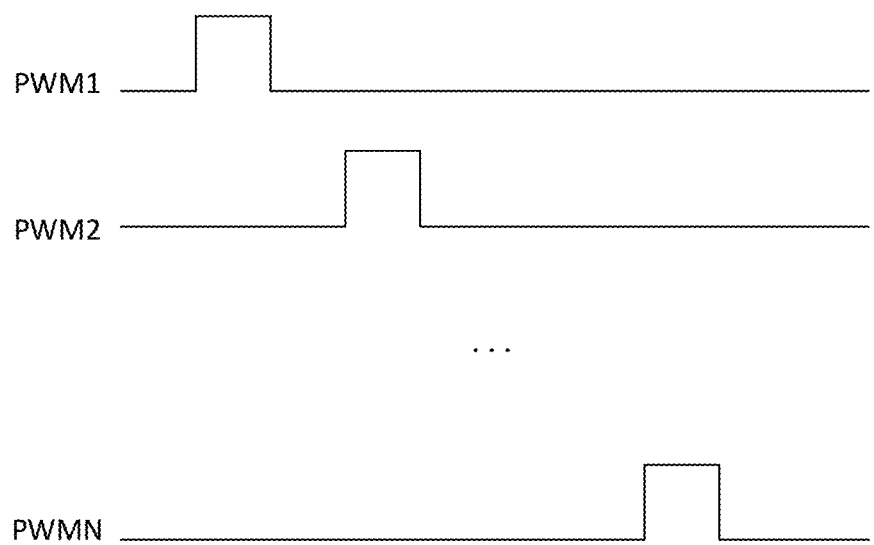
FIG. 2 schematically illustrates waveforms of signals PWM1-PWMN in the power supply circuit of FIG. 1.
Figure 3:
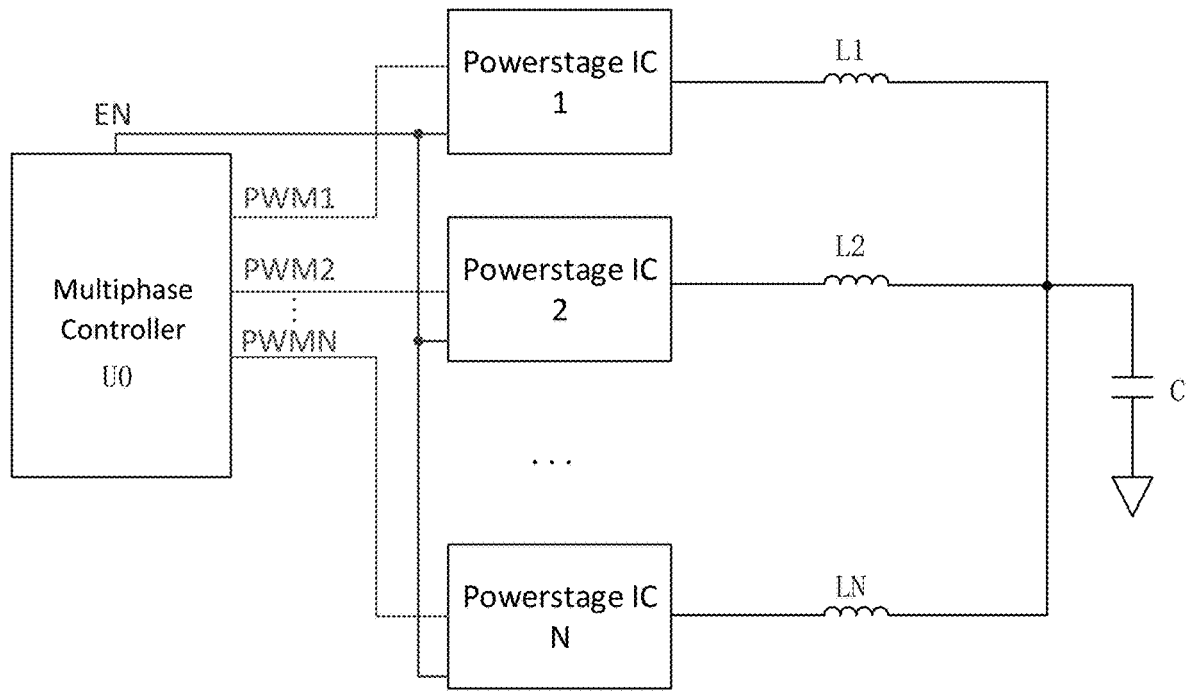
FIG. 3 schematically illustrates how a multiphase controller is connected to power processing circuits of multiple phases in accordance with an embodiment of the present invention.

As an example, referring to FIG. 3, a multiphase controller U0 has pins of the three categories, PWM, Enable (EN) and Temperature Indicator (TSENS) (not shown). Specifically, the multiphase controller U0 has N PWM pins PWM1-PWMN, one Enable pin EN and one Temperature Indicator pin TSENS. The PWM pins PWM1-PWMN of the multiphase controller U0 are connected, via respective signal connections, to PWM pins of respective power processing circuits Powerstage IC 1-N of respective N phases. That is, the pin PWM1 of the multiphase controller U0 is connected to the power processing circuit Powerstage IC 1, the pin PWM2 of the multiphase controller U0 to the power processing circuit Powerstage IC2, . . . , and the pin PWMN of the multiphase controller U0 to the power processing circuit Powerstage IC N. The power processing circuits Powerstage IC 1-N of the N phases are connected to the common Enable pin EN, where N, the number of the PWM pins, is not smaller than 2. In addition, the power processing circuit Powerstage IC 1 is connected in series with an inductor L1, the power processing circuit Powerstage IC 2 with an inductor L2, . . . , and the power processing circuit Powerstage IC N with an inductor LN. The other ends of the inductors L1-LN that are connected in series with the respective power processing circuits Powerstage IC 1-N of the respective N phases are connected to one end of a single common output capacitor C, with the other end of the output capacitor C being grounded. The inductors L1-LN and the output capacitor C may be either discrete components, or equivalent elements of an integrated circuit. In this example, a particular process of data exchange between the multiphase controller U0 and any of the power processing circuits Powerstage IC 1-N may include the steps as follows:

S1.1.1: The multiphase controller U0 configures a signal at the Enable pin EN in a first state representing an operating mode or in a second state representing a first data mode. The first state is represented by, for example, a low voltage level or high voltage level higher than the low voltage level, while the second state is represented by, for example, a medium voltage level different from both the low and high voltage levels. In particular, referring to FIG. 4 or 5, when the multiphase controller U0 configures the signal at the Enable pin EN in the medium voltage level, then the power processing circuit receives a signal that instructs it to enter the first data mode. In another embodiment, when the multiphase controller U0 configures the signal at the Enable pin EN in the medium voltage level and maintains it in that level for a predetermined period of time, then the power processing circuit enters the first data mode. In this way, malfunction from signal interference can be avoided.

Figure 4:
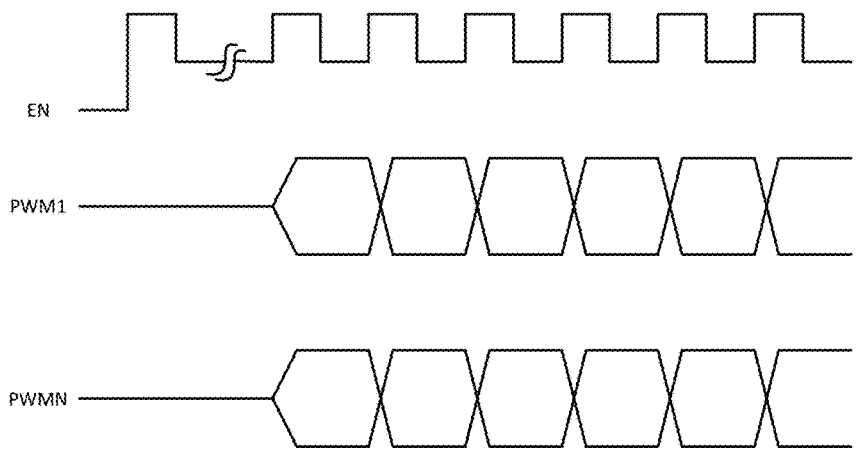
FIG. 4 schematically illustrates a waveform of signals in the connection scheme of FIG. 3.

S1.1.2: The power processing circuit enters the first data mode. In specific implementations, the first data mode can be configured using either of the following two approaches:

Approach 1: Referring to FIG. 4, configure the Enable pin EN as a clock bus that provides a clock signal CLK consisting of logical 0's and 1's and the PWM pins PWM1-PWMN connected to the respective power processing circuits Powerstage IC 1-N as data buses, thus allowing data exchange between the multiphase controller U0 and the power processing circuits Powerstage IC 1-N, wherein a high voltage level at the Enable pin EN corresponds to a logical 1 and a medium voltage level at the Enable pin EN corresponds to a logical 0.

Figure 5:
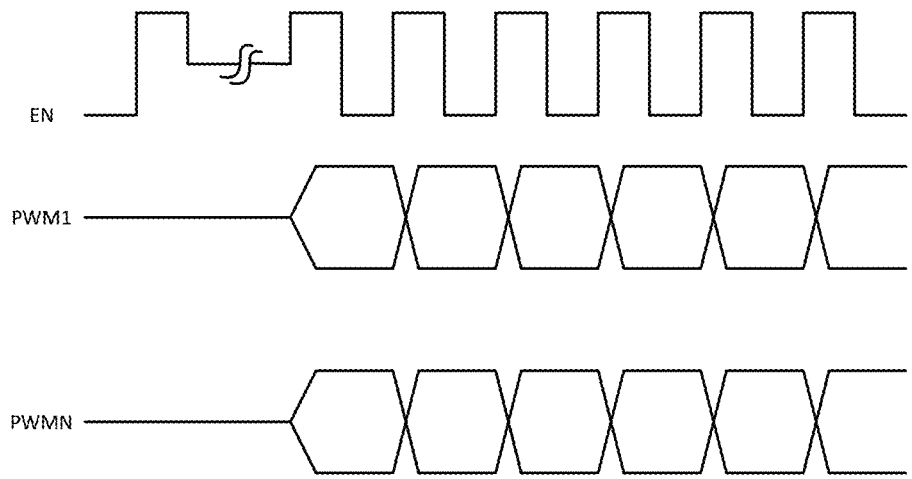
FIG. 5 schematically illustrates another waveform of signals in the connection scheme of FIG. 3.

Approach 2: Referring to FIG. 5, configure the Enable pin EN as a clock bus that provides a clock signal CLK consisting of logical 0's and 1's and the PWM pins PWM1-PWMN connected to the power processing circuits as data buses, thus allowing data exchange between the multiphase controller U0 and the power processing circuit Powerstage IC 1-N, wherein a high voltage level at the Enable pin EN corresponds to a logical 1 and a low voltage level at the Enable pin EN corresponds to a logical 0.

In the above example, with the pins PWM1-PWMN and the signal connections connected thereto serve as data buses, upon the power processing circuit receiving a digital signal from a corresponding one of the data buses, a digital-to-analog conversion (DAC) circuit therein (not shown) converts the received signal into an analog signal that controls operation of the power processing circuit Powerstage IC 1-N. Alternatively, a digital signal from the digital bus is processed by a DAC circuit and then fed to the power processing circuit Powerstage IC 1-N. Similarly, there are two approaches available for the multiphase controller to read data from any of the power processing circuits. In this way, operation mode configuration and detection can be accomplished according to the requirements of customers or practical applications for the power processing circuit. The data exchanged may include, but is not limited to, at least one of a phase identifier, an over-current protection threshold, an over-current protection threshold, an over-temperature protection threshold, a current sampling gain, a current sampling bias, a temperature sampling gain, a temperature sampling bias and a drive speed of the power processing circuit Powerstage IC 1-N.

In the multiphase power processing circuitry according to the present embodiment, the first data mode can be triggered by properly configuring the Enable pin EN, and exchange of data with any of the power processing circuits Powerstage IC 1-N, e.g., a phase identifier (referring to an address of the power processing circuit) thereof, can be enabled by using the Enable pin EN as a clock bus and the pins PWM1-PWMN as data buses, thus allowing higher flexibility.

Figure 6:
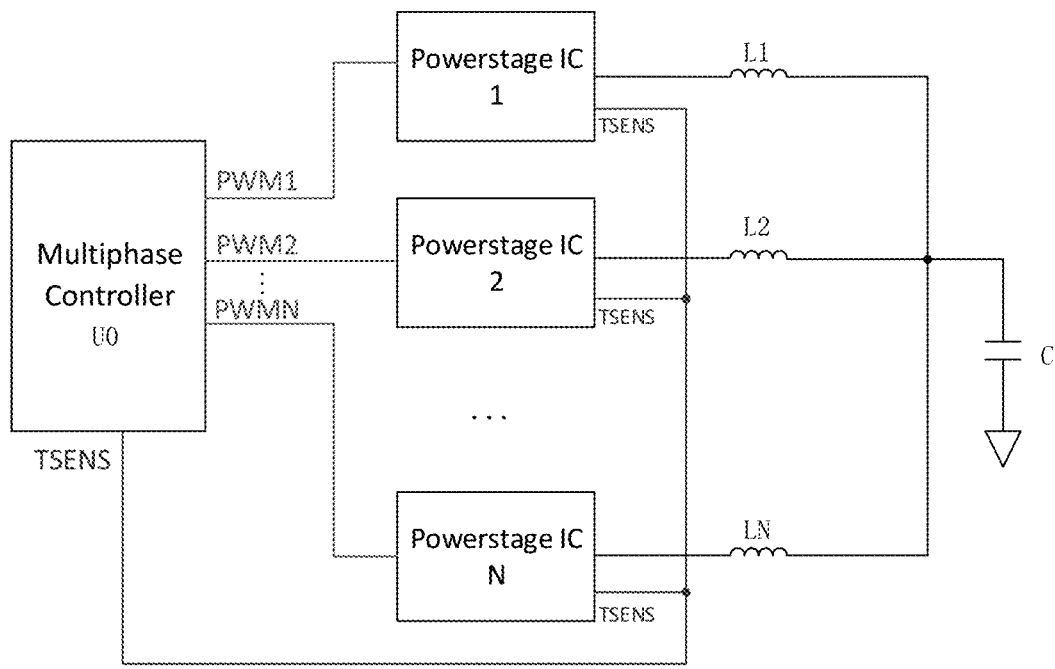
FIG. 6 schematically illustrates how a multiphase controller is connected to power processing circuits of multiple phases in accordance with another embodiment of the present invention.

As another example, referring to FIG. 6, a multiphase controller U0 has pins of the three categories, PWM, Enable (EN) (not shown) and Temperature Indicator (TSENS). Specifically, the multiphase controller U0 has N PWM pins PWM1-PWMN, one Enable pin EN and one Temperature Indicator pin TSENS. The PWM pins PWM1-PWMN of the multiphase controller U0 are connected, via respective signal connections, to PWM pins of respective power processing circuits Powerstage IC 1-N. In addition, the power processing circuits Powerstage IC 1-N are connected to the common Temperature Indicator pin TSENS, where N is not smaller than 2. Further, the power processing circuit Powerstage IC 1 is connected in series with an inductor L1, the power processing circuit Powerstage IC 2 with an inductor L2, . . . , and the power processing circuit Powerstage IC N with an inductor LN. The other ends of the inductors L1-LN that are connected in series with the respective power processing circuits Powerstage IC 1-N of the respective N phases are connected to one end of a single common output capacitor C, with the other end of the output capacitor C being grounded. The inductors L1-LN and the output capacitor C may be either discrete components, or equivalence elements of an integrated circuit. In this example, a particular process of data exchange between the multiphase controller U0 and any of the power processing circuits Powerstage IC 1-N may include the steps as follows:

S1.2.1: The multiphase controller U0 configures a signal at the Temperature Indicator pin TSENS in a third state representing an operating mode or in a fourth state representing a second data mode. The third state is represented by, for example, a low voltage level or high voltage level higher than the low voltage level, while the fourth state is represented by, for example, a medium voltage level different from both the low and high voltage levels.

Figure 7:
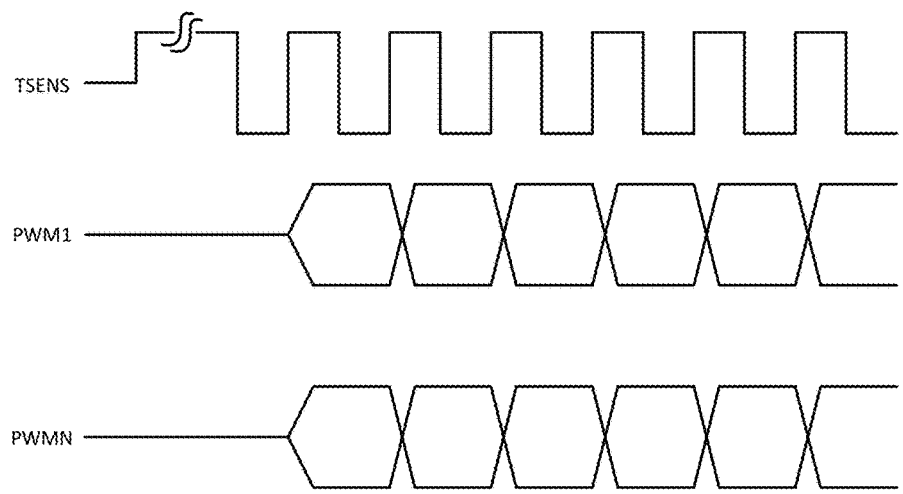
FIG. 7 schematically illustrates a waveform of signals in the connection scheme of FIG. 6.

In particular, referring to FIG. 7, when the multiphase controller U0 configures the signal at the Temperature Indicator pin TSENS to be the medium voltage level, then the power processing circuit enters the second data mode. In another embodiment, when the multiphase controller U0 configures the signal at the Temperature Indicator pin TSENS in the medium voltage level and maintains it in that level for a predetermined period of time, then the power processing circuit enters the second data mode. In this way, malfunction from signal interference can be avoided.

S1.2.2: The power processing circuit enters the second data mode. In specific implementations, the second data mode may be configured in a similar manner as has been described above with reference to FIGS. 4 and 5 and step S1.1.2 so that the Temperature Indicator pin TSENS serves as a clock bus and the PWM pins PWM1-PWMN connected to the respective power processing circuits Powerstage IC 1-N serves as data buses DATA, thus allowing exchange of data between the multiphase controller U0 and the power processing circuit. Upon the power processing circuit receiving a digital signal from a corresponding one of the data buses, a DAC circuit therein (not shown) converts the received signal into an analog signal that controls operation of the power processing circuit. Alternatively, a digital signal from the digital bus is processed by a DAC circuit and then fed to the power processing circuit. Similarly, there are two approaches available for the multiphase controller to read data from any of the power processing circuits, and a detailed description thereof is deemed unnecessary and omitted herein.

In the multiphase power processing circuitry according to the present embodiment, the second data mode can be triggered by properly configuring the Temperature Indicator pin TSENS, and exchange of data with any of the power processing circuits Powerstage IC 1-N, e.g., a phase identifier (address) thereof, can be enabled by using the Temperature Indicator pin TSENS as a clock bus and the pins PWM1-PWMN as data buses, thus allowing better flexibility.

Figure 8:
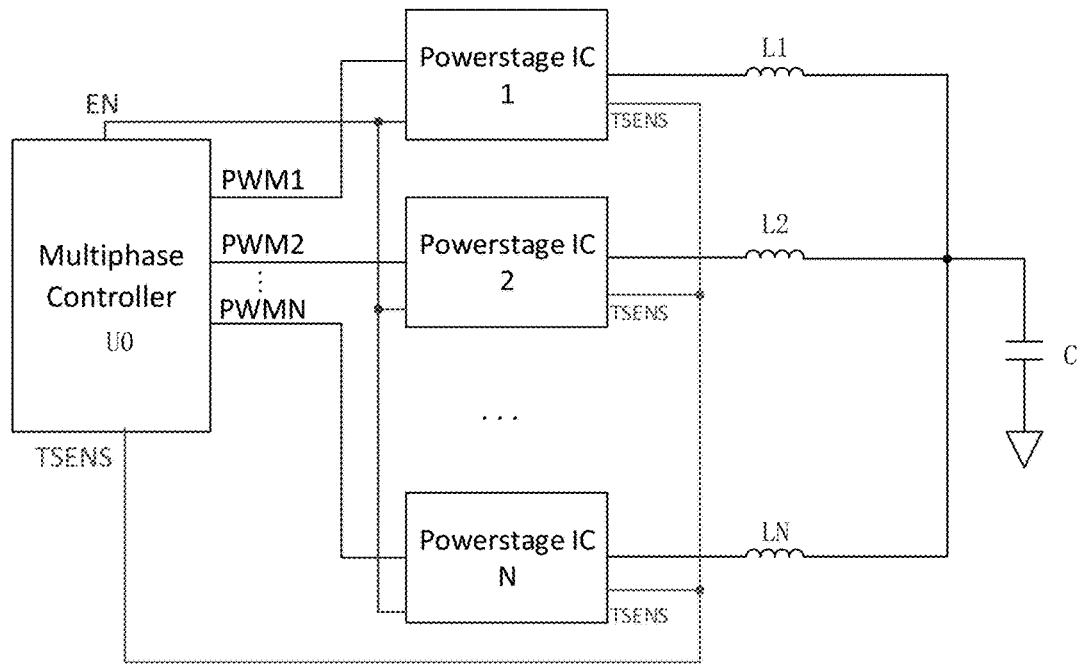
FIG. 8 schematically illustrates how a multiphase controller is connected to power processing circuits of multiple phases in accordance with a further embodiment of the present invention.

As a further example, referring to FIG. 8, a multiphase controller U0 configures a signal at an Enable pin EN in a first state representing an operating mode or in a second state representing a first data mode. Reference can be made to the above description of step S1.1.1 for details in the configuration of the signal at the Enable pin EN in the first or second state, and a further detailed description thereof is thus omitted here.

Figure 9:
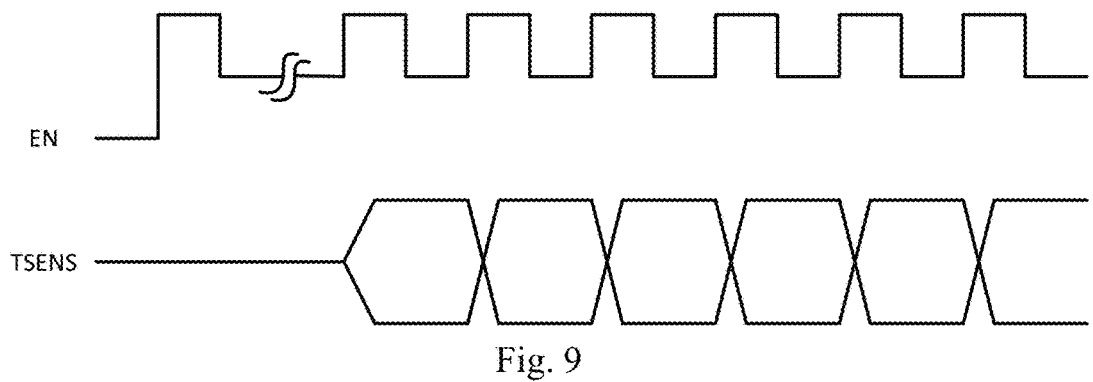
FIG. 9 schematically illustrates a waveform of signals in the connection scheme of FIG. 8.

In this example, when any of power processing circuits Powerstage IC 1-N of respective N phases receives a signal that instructs it to enter the first data mode where the Enable pin EN serves as a clock bus CLK and a Temperature Indicator pin TSENS serves as a data bus DATA, the multiphase controller U0 exchanges data with the power processing circuit Powerstage IC 1-N, as shown in FIG. 9. The same function can be accomplished when the Temperature Indicator pin TSENS is configured as a clock bus CLK and the Enable pin EN as a data bus DATA. The data exchanged with the power processing circuit Powerstage IC 1-N may include, but is not limited to, at least one of a phase identifier, an over-current protection threshold, an over-current protection threshold, an over-temperature protection threshold, a current sampling gain, a current sampling bias, a temperature sampling gain, a temperature sampling bias and a drive speed.

As a further example, a multiphase controller U0 configures a signal at a Temperature Indicator pin TSENS in a third state representing an operating mode or in a fourth state representing a second data mode. Reference can be made to the above description of step S1.1.1 for details in the configuration of the signal at the Temperature Indicator pin TSENS in the third or fourth state, and a further detailed description thereof is thus omitted here.

In this example, when any of power processing circuits Powerstage IC 1-N of respective N phases receives a signal that instructs it to enter the first data mode where an Enable pin EN serves as a clock bus CLK and the Temperature Indicator pin TSENS as a data bus DATA, the multiphase controller U0 exchanges data with the power processing circuit Powerstage IC 1-N, as shown in FIG. 9. The same function can be accomplished when the Temperature Indicator pin TSENS is configured as a clock bus CLK and the Enable pin EN as a data bus DATA.

In the above two examples of control of multiphase power processing circuitry, a data mode can be triggered by the Enable pin EN and/or Temperature Indicator pin TSENS, in which one of the Enable pin EN and the Temperature Indicator pin TSENS is configured as a clock bus and the other as a data bus. This enables flexible, quick configuration of the power processing circuits Powerstage IC 1-N and data acquisition therefrom.

Based on the same inventive concept, in embodiments of the present invention, there is also provided a multiphase power processing circuitry control method for performing data exchange in the multiphase power processing circuitry in the above examples.

In summary, according to the present invention, exchange of data is achievable between a multiphase controller and any of power processing circuits via pins of at least two of the three categories, Enable, PWM and Temperature Indicator, of the multiphase controller. The exchanged data may include, but is not limited to, a phase identifier, an over-current protection threshold, an over-current protection threshold, an over-temperature protection threshold, a current sampling gain, a current sampling bias, a temperature sampling gain, a temperature sampling bias, a drive speed and the like of the power processing circuit. In this way, improvements in system flexibility and operational security are obtained.

The description presented above is merely that of a few preferred embodiments of the present invention and does not limit the scope thereof in any sense. Any and all changes and modifications made by those of ordinary skill in the art based on the above teachings fall within the scope as defined in the appended claims.

What is claimed is:

1. A multiphase power processing circuit, comprising:
   a multiphase controller comprising pins of three categories, PWM, Enable and Temperature Indicator, the multiphase controller comprising a plurality of PWM pins;
   a plurality of power processing circuits each coupled to a corresponding one of the plurality of PWM pins of the multiphase controller, each of the plurality of power processing circuits coupled to an Enable pin and a Temperature Indicator pin of the multiphase controller, wherein the multiphase controller is configured for exchange of data with any of the power processing circuits via pins of at least two of the three categories,
   wherein a signal at the Enable pin is configured by the multiphase controller to have a first state representing an operating mode or a second state representing a first data mode, and wherein the exchange further comprises:
   controlling the signal at the Enable pin to have the second state so that the power processing circuit enters the first data mode; and
   in the first data mode, configuring a pin of one of the three categories as a clock bus that provides a clock signal and a pin of another one of the three categories as a data bus used for exchanging data between the multiphase controller and each of the plurality of power processing circuits.

2. The multiphase power processing circuit of claim 1, wherein the first state is represented by a low or high voltage level and the second state is represented by a medium voltage level, the low voltage level being lower than the high voltage level, the medium voltage level differing from the low or high voltage level.

3. The multiphase power processing circuit of claim 1, wherein the data comprises at least one of a phase identifier, an over-current protection threshold, an over-current protection threshold, an over-temperature protection threshold, a current sampling gain, a current sampling bias, a temperature sampling gain, a temperature sampling bias and a drive speed of any of the plurality of power processing circuits.

4. The multiphase power processing circuit of claim 3, wherein the multiphase controller is configured for parameter configuration of each of the plurality of power processing circuits based on the exchanged data.

5. The multiphase power processing circuit of claim 3, wherein the multiphase controller is configured to obtain the exchanged data from each of the plurality of power processing circuits.

6. The multiphase power processing circuit of claim 1, wherein the medium voltage level representing the second state that represents the first data mode is maintained for a predetermined period of time.

7. A multiphase power processing circuit control method for control of the multiphase power processing circuit of claim 1.

8. A multiphase power processing circuit, comprising:
   a multiphase controller comprising pins of three categories, PWM, Enable and Temperature Indicator, the multiphase controller comprising a plurality of PWM pins;
   a plurality of power processing circuits each coupled to a corresponding one of the plurality of PWM pins of the multiphase controller, each of the plurality of power processing circuits coupled to an Enable pin and a Temperature Indicator pin of the multiphase controller, wherein the multiphase controller is configured for exchange of data with any of the power processing circuits via pins of at least two of the three categories,
   wherein a signal at the Temperature Indicator pin is configured by the multiphase controller to have a third state representing an operating mode or a fourth state representing a second data mode, and wherein the exchange further comprises:
   controlling the signal at the Temperature Indicator pin to have the fourth state so that the power processing circuit enters the second data mode; and
   in the second data mode, configuring a pin of one of the three categories as a clock bus that provides a clock signal and a pin of another one of the three categories as a data bus and used for exchanging data between the multiphase controller and each of the plurality of power processing circuits.

9. The multiphase power processing circuit of claim 8, wherein the third state is represented by a low or high voltage level and the fourth state is represented by a medium voltage level, the low voltage level being lower than the high voltage level, the medium voltage level differing from the low or high voltage level.

10. The multiphase power processing circuit of claim 8, wherein the medium voltage level representing the fourth state that represents the second data mode is maintained for a predetermined period of time.

11. The multiphase power processing circuit of claim 8, wherein the data comprises at least one of a phase identifier, an over-current protection threshold, an over-current protection threshold, an over-temperature protection threshold, a current sampling gain, a current sampling bias, a temperature sampling gain, a temperature sampling bias and a drive speed of any of the plurality of power processing circuits.

12. The multiphase power processing circuit of claim 11, wherein the multiphase controller is configured for parameter configuration of each of the plurality of power processing circuits based on the exchanged data.

13. The multiphase power processing circuit of claim 11, wherein the multiphase controller is configured to obtain the exchanged data from each of the plurality of power processing circuits.

\* \* \* \* \*